US008452479B2

(12) United States Patent
Nath et al.

(10) Patent No.: US 8,452,479 B2
(45) Date of Patent: May 28, 2013

(54) IN-CAR SERVICE INTERVAL ADJUSTMENT DEVICE

(75) Inventors: Ujjual Nath, Manhattan Beach, CA (US); Gaurav Sharma, Irvine, CA (US); William Fletcher, Westlake Village, CA (US); Douglas MacGlashan, Redondo Beach, CA (US); Brian Billett, Los Angeles, CA (US)

(73) Assignee: Kaarya, LLC, Torrance, CA (US)

( * ) Notice: Subject to any disclaimer, the term of this patent is extended or adjusted under 35 U.S.C. 154(b) by 0 days.

(21) Appl. No.: 13/323,715

(22) Filed: Dec. 12, 2011

(65) Prior Publication Data

US 2012/0150381 A1 Jun. 14, 2012

Related U.S. Application Data

(60) Provisional application No. 61/421,642, filed on Dec. 10, 2010.

(51) Int. Cl.
*G07C 5/00* (2006.01)
*G07C 5/08* (2006.01)
*G01C 22/00* (2006.01)

(52) U.S. Cl.
USPC ........ 701/29.4; 701/33.4; 701/517; 701/29.1; 701/29.6; 702/181; 702/184; 705/305; 340/572.1; 340/568.1

(58) Field of Classification Search
USPC ........... 701/29.4, 33.4, 517, 29.1; 702/33–35, 702/81, 82, 84, 179–185; 705/305; 340/572.1, 340/568.1
See application file for complete search history.

(56) References Cited

U.S. PATENT DOCUMENTS

| | | | | |
|---|---|---|---|---|
| 4,138,964 | A | 2/1979 | Fujita | |
| 4,742,476 | A | 5/1988 | Schwartz | |
| 5,382,942 | A | 1/1995 | Raffa | |
| 5,633,796 | A | 5/1997 | Cullen | |
| 5,642,284 | A | 6/1997 | Parupalli | |
| 5,705,977 | A | 1/1998 | Jones | |
| 6,253,601 | B1 | 7/2001 | Wang | |
| 6,580,366 | B1 | 6/2003 | Engfehr | |
| 7,522,069 | B2 * | 4/2009 | Tunnell et al. | 340/995.19 |
| 7,802,198 | B2 | 9/2010 | Obradovvich | |
| 8,060,274 | B2 | 11/2011 | Boss | |
| 8,073,653 | B2 * | 12/2011 | Suzuki et al. | 702/181 |

(Continued)

OTHER PUBLICATIONS

Steven Stockton, Using Differential GPS Positioning for Elevation Determination, Department of the Army Techn ca Letter No. 110-1-183, (1998), pp. 1-2.*

(Continued)

*Primary Examiner* — Thomas Tarcza
*Assistant Examiner* — Adam Tissot
(74) *Attorney, Agent, or Firm* — Brian S. Billett

(57) ABSTRACT

Disclosed is a device and method for providing service interval notifications to a vehicle operator, and to incorporate relevant vehicle operating conditions which most directly impact the longevity of engine lubrication and other wear prone components of vehicles. Wear prone conditions which are determined include city driving, frequency of "cold" starts, frequency of "winter" "cold" starts, and high load high grade travel. The device and method utilize as a primary input a location aware sensor device and as a secondary input a source for the ambient temperature either retrieved from an Internet source or a local ambient temperature sensor. No direct vehicle sensor is utilized for the service interval adjustment performed by the device and method.

17 Claims, 7 Drawing Sheets

U.S. PATENT DOCUMENTS

| | | | | |
|---|---|---|---|---|
| 2005/0075829 | A1* | 4/2005 | Polimadei | 702/165 |
| 2006/0136105 | A1 | 6/2006 | Larson | |
| 2006/0200286 | A1* | 9/2006 | Kumagai et al. | 701/35 |

OTHER PUBLICATIONS

Steven Stockton, Using Differential GPS Positioning for Elevation Determination, Department of the Army Technical Letter No. 110-1-183, (1998), pp. 1-2.

Richard Stone and Jeffrey K. Ball, Automotive Engineering Fundamentals, (2004), pp. 195-197.

Thomas D. Gillespie, Fundamentals of Vehicle Dynamics, (1992), pp. 118-120.

Salvatore RAND, Petroleum Products, (2004), Automotive Engine Oil and Performance Testing, pp. 142-144, 148.

Society of Automotive Engineers, 2003 SAE Handbook, (2003), SAE J183 Standard, pp. 12.1-12.25.

Yin Lou et. al., ACM SIGSPATIAL GIS 2009, (2009), Map-Matching for Low-Sampling-Rate GPS Trajectories.

* cited by examiner

IN-CAR SERVICE INTERVAL ADJUSTMENT DEVICE

This application for patent claims priority from provisional patent application 61/421,642.

FIELD OF THE INVENTION

The present invention generally relates to the field of scheduled vehicle service interval determination, specifically systems that monitor the vehicle use and notify the operator when regular maintenance of the vehicle should be performed, including oil changes, oil and air filter changes, coolant system flushes, and other service of vehicle components that need periodic maintenance.

BACKGROUND OF THE INVENTION

Vehicles, particularly internal combustion engine powered vehicles, require the replacement of consumable components or resources for extended operation. The most obvious of these is the vehicle fuel. Fuel gauges (or charge gauges in the case of electric vehicles) are prominently displayed to the driver. Drivers can thus generally predict when the fuel stored on-board the vehicle will be consumed, and can replenish the consumed fuel before the vehicle is stranded.

A number of other components of vehicles need regular service in addition to refilling the fuel, but the determination of necessary service is not nearly as simple. This includes the engine lubrication, the engine coolant system, the vehicle braking friction surfaces, the lubrication and air intake filters, and spark plugs among others. Most important among these is the engine lubrication, which has a widely variable lifespan depending on, among other factors, the operation of the vehicle and the environment of the vehicle operation. Although these variances are well-known in the art, they are difficult to track, and most vehicle manufacturers recommend fixed intervals of vehicle mileage or time between servicing these vehicle components. Systems such as Jones U.S. Pat. No. 5,705,977 and Touhey U.S. Pat. No. 6,927,682 provide third-party solutions for notifying drivers of required service based on manufacturer recommended maintenance service intervals. These systems are limited in many respects, including their limitation for failing to account for variable vehicle operation and conditions.

Improved service interval reminder systems have been developed which account, in some manner, for vehicle operation, such as Bai U.S. Pat. No. 7,129,827, which provides maintenance service interval adjustments based upon vehicle operating time, and Muhlberger et. al. U.S. Pat. No. 4,533,900, a system for recommending service intervals based upon both mileage and various engine sensor readings used to detect high load conditions. Such modified service interval systems are useful, but suffer certain limitations. Systems such as Bai U.S. Pat. No. 7,129,827 do not factor the load condition or operating conditions of the vehicle which may have significant impact on the service requirements of the vehicle. Systems such as Muhlberger et al U.S. Pat. No. 4,533,900 rely upon engine sensor input, which may not be available for a particular vehicle and a connection to the vehicle odometer, which is generally only available to the vehicle manufacturer due to the security sensitivity of the odometer electronic signal access.

Currently, no service interval adjustment and notification system accounts for both mileage and load factors on the vehicle wear, without reliance upon a direct connection to the vehicle sensor systems.

SUMMARY OF THE INVENTION

It is a general object of the invention to provide a platform for providing service interval notifications to a vehicle operator, and to incorporate relevant vehicle operating conditions which most directly impact the longevity of engine lubrication and other wear-prone components of vehicles.

It is a specific object of the invention to provide such a platform for service interval notification without reliance on vehicle sensor systems, as such systems may not be available, or may themselves but unreliable during the service interval.

The present invention is for a device and system which provide a vehicle owner or operator with predictive notification for periodic vehicle service. This capability of this invention departs considerably from prior efforts to provide such a solution in several novel and important aspects. 1) The invention device and system do not rely upon any data or sensor connectivity with the vehicle, 2) the invention device and system provide a standardized and vehicle independent intelligent means for monitoring relevant factors of vehicle wear, and 3) the invention device and system incorporate new and novel relevant factors for adjusting the predicted service interval.

It is well known in the art that engine lubrication, particularly for internal combustion engines, is the most critical engine component that both prevents engine wear and is simultaneously most prone to deterioration and loss of efficacy. According to the bellwether treatise on engine lubrication wear and breakdown, Significance of Tests for Petroleum Products, ed. S. Rand, *Automotive Engine Oil And Performance Testing*, Schwartz and Calcut, pp 140-143, the most significant factors affecting internal combustion engine lubrication wear include a) the amount of city vs. freeway driving, b) high load, high temperature operation, and c) the frequency of "cold" and "winter" engine starts. According to Schwartz and Calcut, wear during city driving is far greater than freeway diving, as is the case during high load, high temperature conditions, such as extended mountainous driving. Most critical to rapid breakdown of engine oil which would require a shortened service period are the frequencies of "cold" (engine at ambient temperature), and "winter" (a cold engine start with very low ambient temperature) engine starts.

The findings of Schwartz and Calcut, which although widely accepted in the art, are not frequently utilized for adjusting service intervals. The present invention incorporates these findings in general and embodies them as model parameters into the service interval adjustment platform model of the invention.

Another fundamental component of the present invention platform is the utilization of a location aware sensor device to provide an accurate and reliable sensor input for tracking vehicle motion, and thus both mileage and operating patterns of the vehicle, without any direct vehicle sensor input.

Two primary embodiments of the invention are presented. In the preferred embodiment, the platform device of the invention is an adapted use of an operator's smart phone, which generally provides the capability of a location aware sensor, such as the Global Positioning System (GPS), a means for wireless data communication with the Internet, and a means for detecting proximity to the operator's vehicle, such as by Bluetooth pairing or identification detection. An alternate embodiment of the invention is a dedicated on-board device with these same attributes and likewise no direct connection to the vehicle sensor system.

In the present invention, when in proximity to the operator's vehicle, the utilization of the location aware system provides a means for identifying and calculating vehicle operating conditions into four domains of engine wear factors, including city vs. highway driving, the "cold" start factor, the "winter" start factor, and the mountainous/high load factor. Tracked vehicle mileage is adjusted according to these factors and compared against the manufacturer standard recommendation for service in order to obtain an improved vehicle service interval prediction.

BRIEF DESCRIPTION OF THE DRAWINGS

FIG. 1 illustrates a simplified overall logic flow of the device.

FIG. 2 illustrates the preferred embodiment general interaction of the in-car device invention with the navigation satellite broadcast (location awareness system example), as well as the user (by mobile telephone) and the data collection hub and information system operated by the system management company.

FIGS. 4A and 4B provide further explanation for this methodology.

FIG. 7 provides an example of an alternative embodiment device component architecture.

DETAILED DESCRIPTION OF THE INVENTION

Figure 1:
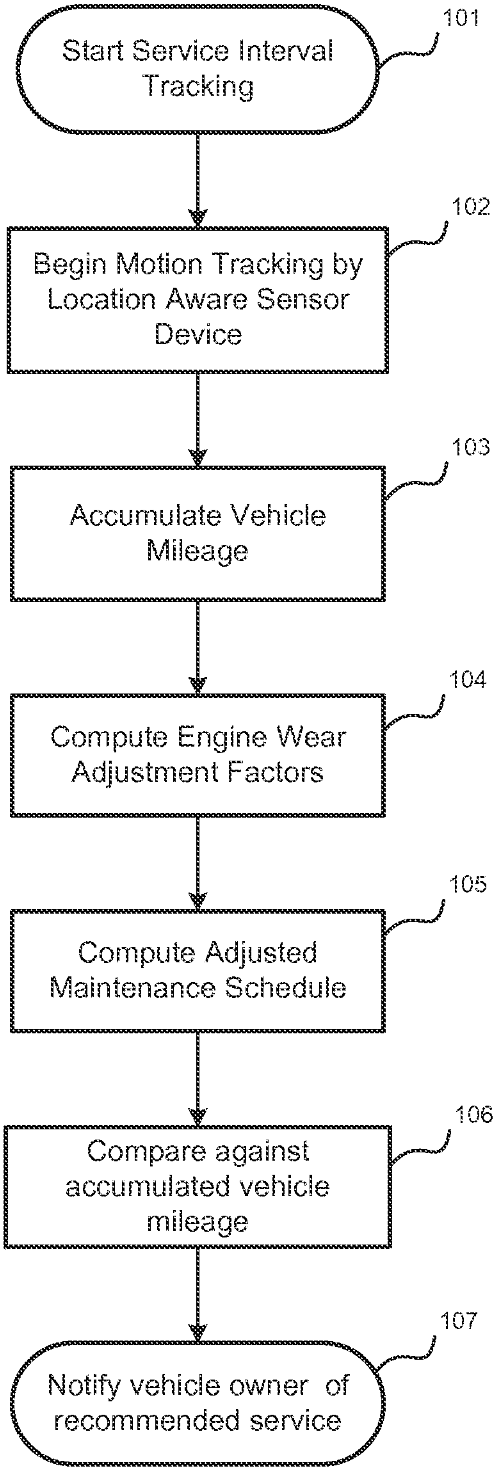
FIG. 1, FIG. 2, and FIG. 7 illustrate the overall architecture of the present invention device and system in the preferred and alternate embodiments.
Figure 2:
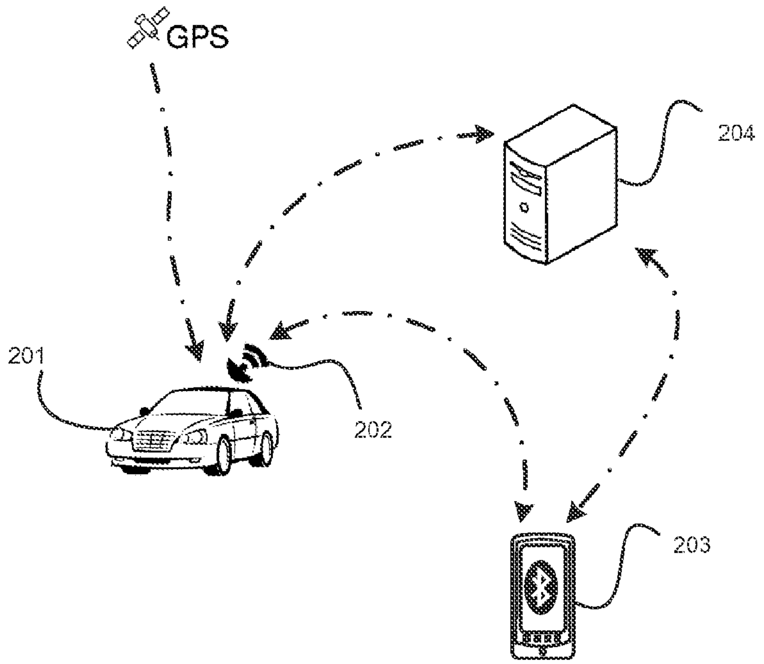

The device and system of the current invention in the preferred and alternate embodiments include a navigation position aware sensor 202, 701, a wireless communication component 203, a programmable central processing unit (CPU) 702, with associated volatile 703 and non-volatile memory 704, for controlling 705 and monitoring the system input and providing relevant output to the user (via GPRS for example 706) 203, 313 when queried or when the automated embedded intelligent system predicts an impending need for service.

The location aware sensor 202/203, 301, 701 embedded within the device may utilize any available wireless location awareness system, including but not limited to GPS, GNSS, GLONASS, BD2, cellular tower triangulation, WiFi triangulation, or the assisted GPS. This described embodiment of the invention utilizes the GPS system as the primary sensor input.

GPS, or the Global Positioning System, consists of a system of global satellites which continuously transmit very precise time signals via radio frequency broadcasts directed to the earth surface. Devices utilizing GPS for location awareness infer the latitude, longitude, time, and elevation of the receiving device based on the differential between the timing of received GPS satellite broadcast signals. These 4 input parameters: latitude, longitude, elevation, and time, are the primary input data for the invention device and system disclosed in preferred and alternate embodiments.

The device of the present invention tracks service intervals and makes relevant adjustments to such intervals for notifying the vehicle operator of necessary scheduled maintenance. FIG. 1 provides a simple explanation of the device operation. When the device begins operating 101 (whether vehicle proximity is detected or the device is installed in the vehicle), the location aware sensor of the device tracks the vehicle motion 102, which is accumulated as total vehicle mileage 103, an equivalent sensor to the vehicle odometer. As detailed below, the engine wear factors are calculated based upon vehicle motion, vehicle elevation, and ambient operating temperature 104. Based upon these wear factors and the manufacturer's suggested service schedule, an adjusted vehicle service interval is computed 105, and compared against the accumulated vehicle mileage 106, to determine whether the vehicle operator should be notified of an impending necessary service action 107.

Figure 3:
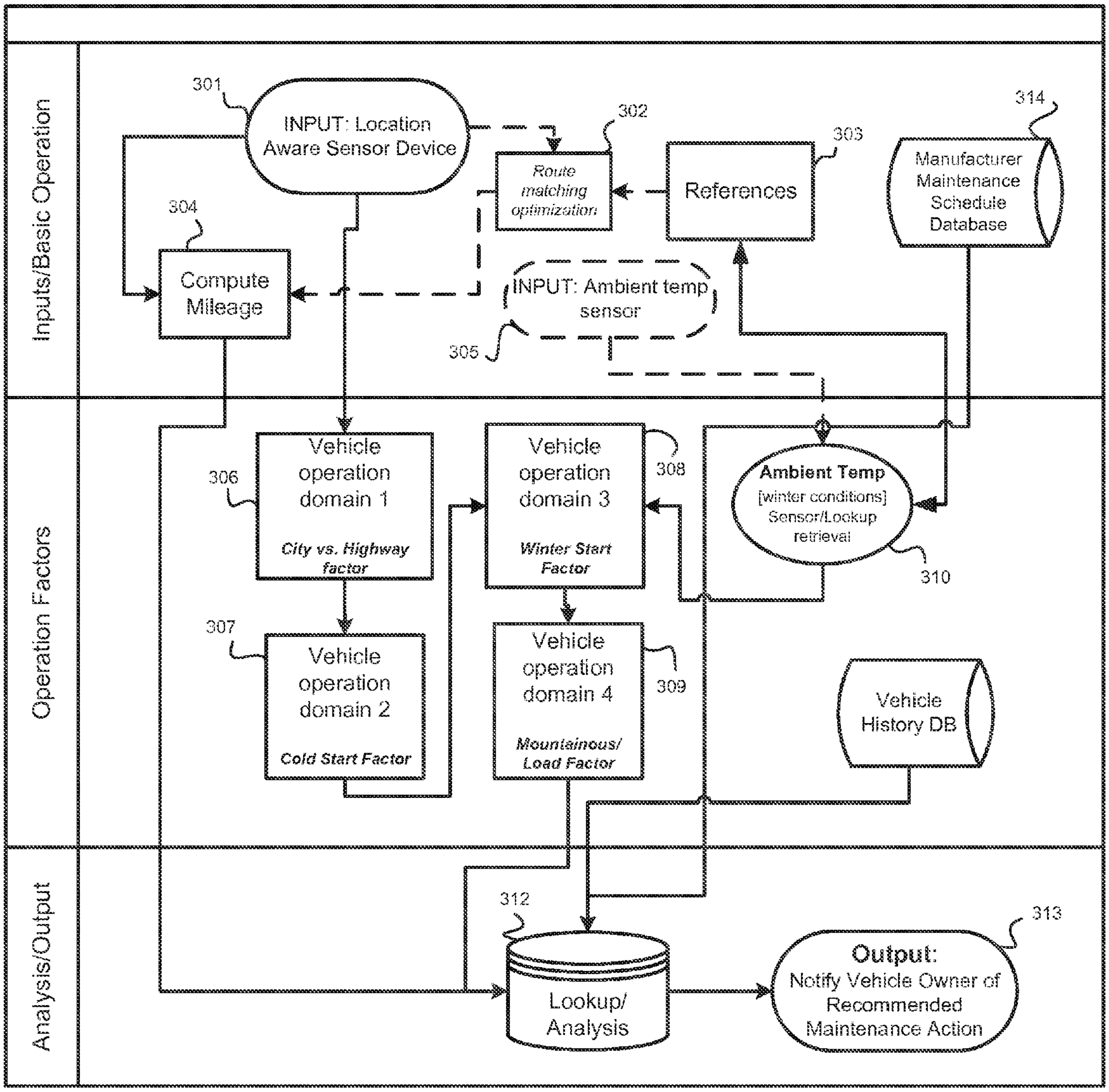
FIG. 3 is a more detailed overall logic flow for the invention.

FIG. 3 is an overview of methodology and logic utilized by the device to perform the intelligent monitor and notification functions. As mentioned above, GPS is the chosen location aware sensor system for this embodiment of the invention and generates output data including the latitude, longitude, elevation and time as show in 301. Mileage, or the aggregate distance traveled by the location aware device is computed in 304 with computational details outlined in FIG. 4. A straight line approximation of distances traveled by the device can suffer from sampling error analogous to aliasing error. Although the primary embodiment of this invention does not include methodology for correcting route errors, the full invention claimed includes an alternative embodiment which incorporates one of several available route matching optimization techniques, which are incorporated as 302 and rely upon wireless data queries to mapping data sources such as Google or stored mapping databases such as Navteq 303.

Another point of novelty and utility of the disclosed invention is the capability to infer vehicle operating conditions which adversely affect wear without relying upon vehicle sensor data, which varies widely between manufacturers and remains years away from standardization beyond basic emissions system sensor information. The invention capability to predict and adjust forthcoming regular vehicle maintenance is shown in FIG. 3 components 306, 307, 308, and 309. An embodiment of this invention to perform this function is detailed below and in FIGS. 4-6.

Based upon published peer reviewed data sources, including learned texts such as the aforementioned work by Schwartz and Calcut, and Society of Automotive Engineers (SAE) research publications, this invention asserts four operating conditions which are utilized to modify the normal service period predictions, which are generally based only upon mileage, or in the alternative, based upon Original Equipment Manufacturer (OEM) specific sensor information. These four factors include a) the percentage of "city" vs. "highway" driving, b) the frequency of engine "cold" starts following a period where the engine has sufficient time to dissipate heat and return to the ambient temperature surrounding it, c) the frequency of extreme "winter" cold starts, which have been identified as an extremely high wear condition, and d) steep grade highway driving, which places an unusually high load condition on the engine.

In order to determine if the frequency of the very high wear "winter" cold starts of the vehicle, the ambient temperature 310 is required. Potential sources for this information include an optional embedded sensor 305, such as a thermocouple and associated data acquisition (DAQ) input for the system, or by utilization of Internet based weather data, such as the National Weather Service, which have the ability via an available application programming interface (API) to provide real-time temperature information corresponding to a latitude/longitude query of the data providers 303. Certain vehicle historical data are input by the user when the device is initially installed, include either the vehicle identification number (VIN) or vehicle make, model number and year, as well as the current odometer mileage reading 311. This information is utilized to establish a baseline to compare with the manufacturer recommended service schedule intervals 314, which in turn act as a baseline for the invention capability for adjusting service interval prediction according to unusual wear operating conditions. As detailed in FIGS. 4-6, this information is utilized to perform an optimization of vehicle service prediction 312.

Figure 4:
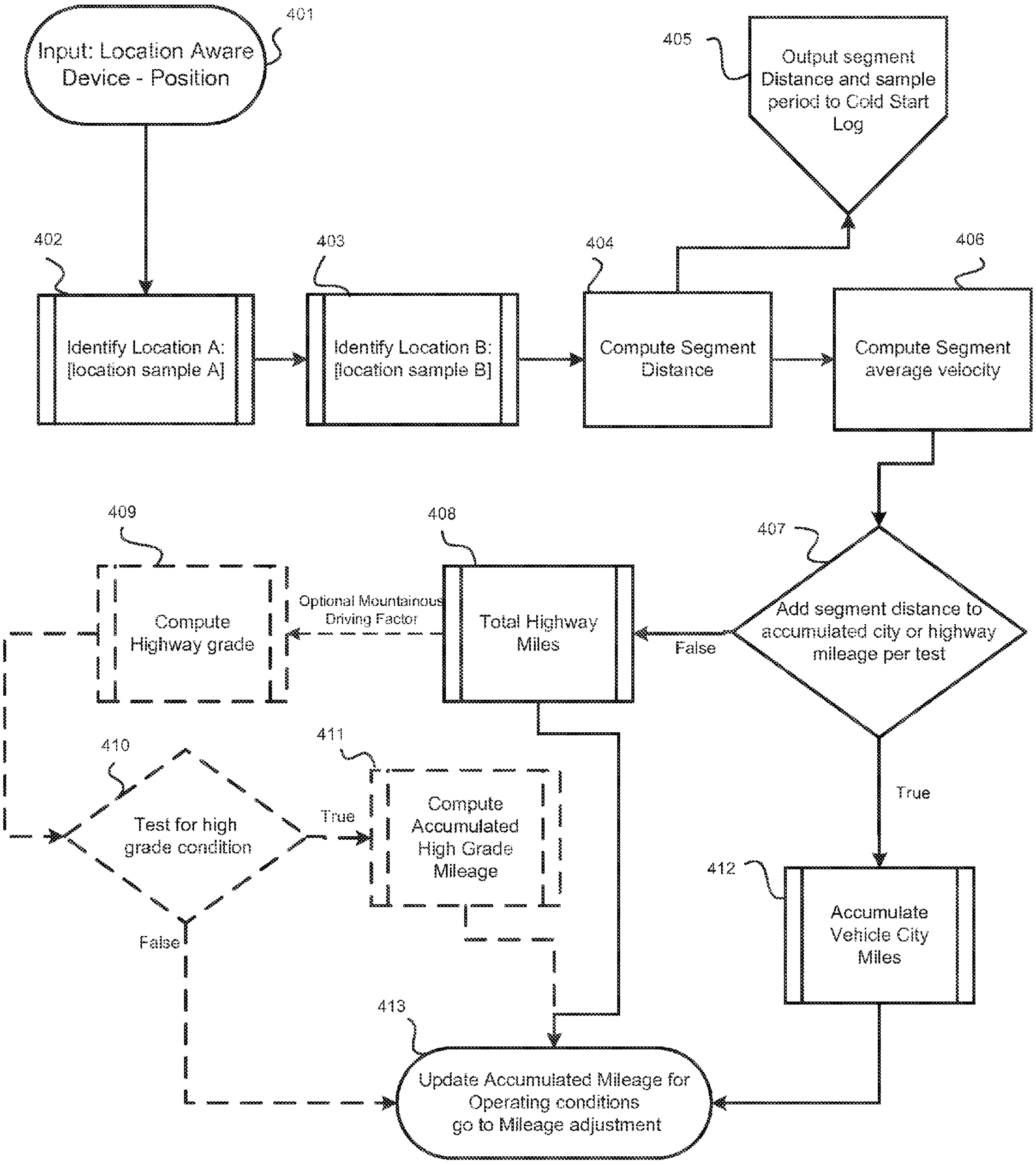
FIG. 4 details the preferred embodiment method for determining the fraction of "city" and "highway" driving patterns.

A detailed outline of the invention device decision and computation for determining and accumulating logged values for "city" and "highway" driving are given in FIG. 4. Parameters and Output data include the following:

Parameters:

$V_h$=vehicle speed threshold for city vs. highway miles $T_{sam}$=Sampling time $Grade_{load}$=highway grade threshold for high load condition Outputs:

$D_{city}$=accumulated city mile $D_{highway}$=accumulated highway miles $D_{load}$=accumulated high load miles $D_{seg}$=distance travelled between navigation segments System inputs 401 latitude, longitude, time, and elevation, provide sufficient information for the current invention to determine the recognized and disparate wear conditions well known as "highway" and "city" driving.

Upon initiation of the device, once the device is successful in its initial location determination at $T_1$, the sample time in 402, it continues to sample location information from the GPS system at intervals $T_{sam}$ identified above. The next sampled device location is stored according to 403 at time $T_2$ (or $T_1+T_{sam}$). Earth surface land distance between locations sampled at $T_1$ and $T_2$ are calculated in this embodiment of the invention according to the accepted Haversine formula:

$$d_{lon}=\text{lon}_2-\text{lon}_1$$

$$d_{lat}=\text{lat}_2-\text{lat}_1$$

$$a=(\sin(d_{lat}/2))^2+\cos(\text{lat}_1)*\cos(\text{lat}_2)*(\sin(d_{lon}/2))^2$$

$$c=2*a\tan 2*(\text{sqrt}(a)-\text{sqrt}(1-a))$$

$$D\text{seg}=R*c \text{ (where } R \text{ is the radius of the Earth)}$$

Segment distance according to this formula is computed in 404. These computed values $D_{seg}$ and the parameter $T_{sam}$, or sample time between location data points, is output to a parallel routine (via element 405) to determine if the device (vehicle) is stationary, and if so, if it has been stationary long enough for the subsequent movement to be considered to be a "cold start".

If the distance $D_{seg}$ computed in 404 exceeds expected variations due to sensor signal error, device movement is affirmed, and the device land speed during the interval of $T_1$ to $T_2$ is computed in 406: $V_{a-b}=D_{seg}/(T_2-T_1)$ Since location is based upon samples taken at discrete intervals, rather than a continuous analog signal, the speed computed in 406 is the mean speed of the device during the interval $T_1$ to $T_2$.

An alternative embodiment of the invention utilizes multiple sample intervals 402-404, before computing the device/vehicle velocity in 406 to compensate for signal and system variations, among other possible aberrations, and to improve system efficiency and accuracy.

Decision point 407 assigns the distance and time associated with the segment (or aggregation of segments in the multiple sample embodiment) with either "highway" or "city" driving, based upon a simple comparison to parameter $V_h$, the threshold for determining highway driving velocity: $V_{a-b}<V_h$. If the average computed velocity of the device during the segment traveled from $T_1$ to $T_2$ exceeds the $V_h$ highway velocity parameter, the distance computed for the segment is accumulated into the logged value storing total "highway" miles ($D_{highway}=D_{highway}+D_{seg}$) driven since the last device reset 408. Similarly in 412, if the velocity computed is below the $V_h$ threshold parameter, the segment is identified as "city" mileage, and the distance of the segment of movement for the device is accumulated into the logged value for total "city" miles driven since the last service reset of the device ($D_{city}=D_{city}-D_{seg}$).

In the disclosed optional embodiment of the invention, the available data for device elevation obtainable from GPS is utilized in 409, 410 and 411 to log distance driven ascending extremely steep highway grades, which constitute particularly high load operating conditions. The threshold for "extreme" grade conditions is set as parameter Grade_load. A value of 4% highway grade is considered a default value for this parameter in this embodiment of the invention.

The grade for a particular segment of highway driving is computed in 409 by dividing the distance by the change in elevation:

$$\text{Grade}_{current}=D_{seg}/(E_a-E_b).$$

Although GPS is known to be problematic for computing absolute elevations, its relative accuracy between sampled positions is sufficient for the purpose of determining the route grade percentage. Mileage for highway segments driven under extreme grade conditions ($\text{Grade}_{current}>\text{Grade}_{load}$) are accumulated into the system value $D_{loaded}$ in 411: $D_{loaded}=D_{loaded}+D_{seg}$.

The computed accumulated logs of mileage driven under "city", "highway", and extreme grade highway conditions are collected in 413 and forwarded to the routine for computing the adjusted service interval mileage.

As an illustration of the practicality and utility of the disclosed methodology for determining accumulated "city" and "highway" miles, FIGS. 4A and 4B are included. FIG. 4A is an annotated version of the EPA "highway" drive cycle data used as an exemplar of driving characteristics which are typical for highway driving. Utilizing the methodology of the current invention as computing highway mileage based on device time and distances traveled in excess of threshold parameter $V_h$, the analytical solution and visualization result is shown. The integration of the device speed over the interval of time spent in excess of the threshold if the analytic solution for the precise mileage of the vehicle:

$$D_{highway}=\int_{t_1}^{t_2} v(t)dt+\int_{t_3}^{t_4} v(t)dt$$

The patterned area corresponding to the "area under the curve" 401A and 401B (combined) is the analytic solution shown graphically. The invention embodiment detailed herein provides a systematic approximation of this solution by utilizing discrete sampled intervals.

Similarly in FIG. 4B, the total city mileage corresponds to the area under the function V(t) during the periods for driving time when $V(t)<V_h$.

Figure 5:
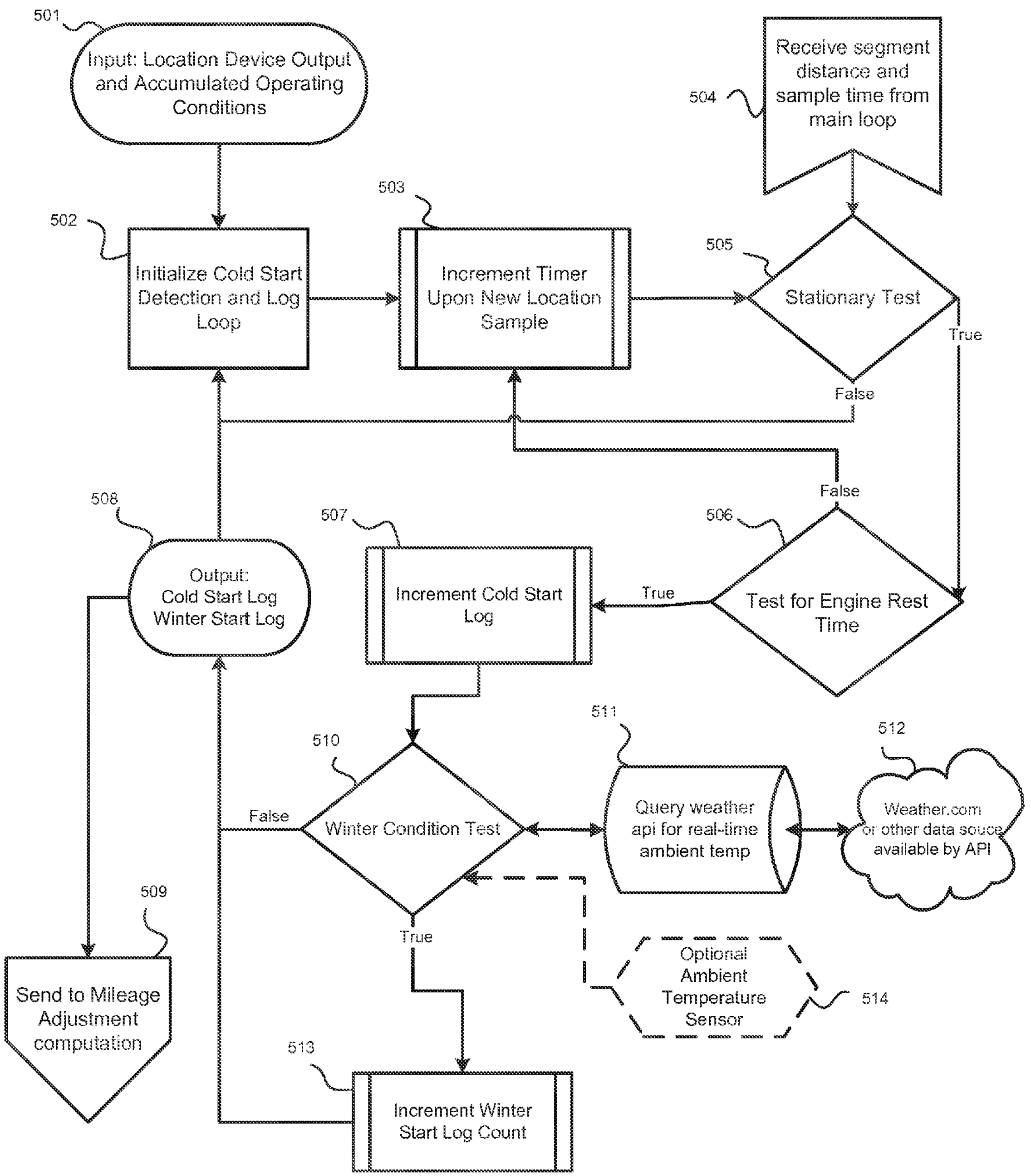
FIG. 5 details a methodology for determining abnormally high frequencies for "cold" engine starts, and for engine starts under extreme winter conditions.

FIG. 5 details the invention device embodiment methodology for detecting and incorporating the high wear conditions of frequent "cold" engine starts, and the extreme high wear condition of "winter" engine starts. These factors are accumulated for the disclosed embodiment of the invention by two basic operations. Engine starts subsequent to time sufficient for the engine to cool to near ambient temperature conditions are considered "cold" starts. This is a widely accepted definition by those skilled in the art. "Winter" starts are defined as "cold" starts performed with extremely low winter ambient temperature weather conditions. Although many if not most vehicles will never experience even a single "winter" engine start as defined in this invention embodiment, millions of vehicles do. According to sound empirical published data, such conditions warrant particular attention and contribute disproportionately to both engine wear and oil degradation.

As an alternate embodiment of this aspect of the invention, the standard On Board Diagnostic (OBD) pin corresponding to the "engine on" time may be provided on a limited exception to this invention's deliberate avoidance of OBD data since such data is currently standardized for all OBD equipped vehicles.

Inputs values from the basic distance and GPS acquisition routines (FIG. 4) which calculate device movement and sample frequency are incorporated into this analysis 501. Key to determining a cold start condition in the absence of on-board sensor data is a determination of how long the device is stationary. A value in units of time $T_{stat}$ is computed and accumulated 503: $T_{stat}=T_{stat}+T_{sam}$ as long as the device remains within the bounds of the location device signal error 505: $D_{seg}<=D_{err}$. If the stationary time for the device exceeds the "engine rest" parameter $E_{rest}$ 506 [$T_{stat}>E_{rest}$] subsequent motion of the device is considered a "cold" start, and accordingly logged 507 [Cold_start_log=Cold_start_log+1].

Once device movement such as this is logged as a "cold" start, the ambient temperature is queried by either Internet based sources 511, 512, or by an embedded sensor within the device itself 514.

Engine starts that are not merely "cold" but that occur at ambient temperatures below a set "winter" threshold $Temp_{amb}<Temp_{min}$ 510 are logged as "winter starts, and the winter start log incremented accordingly 513:

Winter_start_log=Winter_start_log+1

Figure 6:
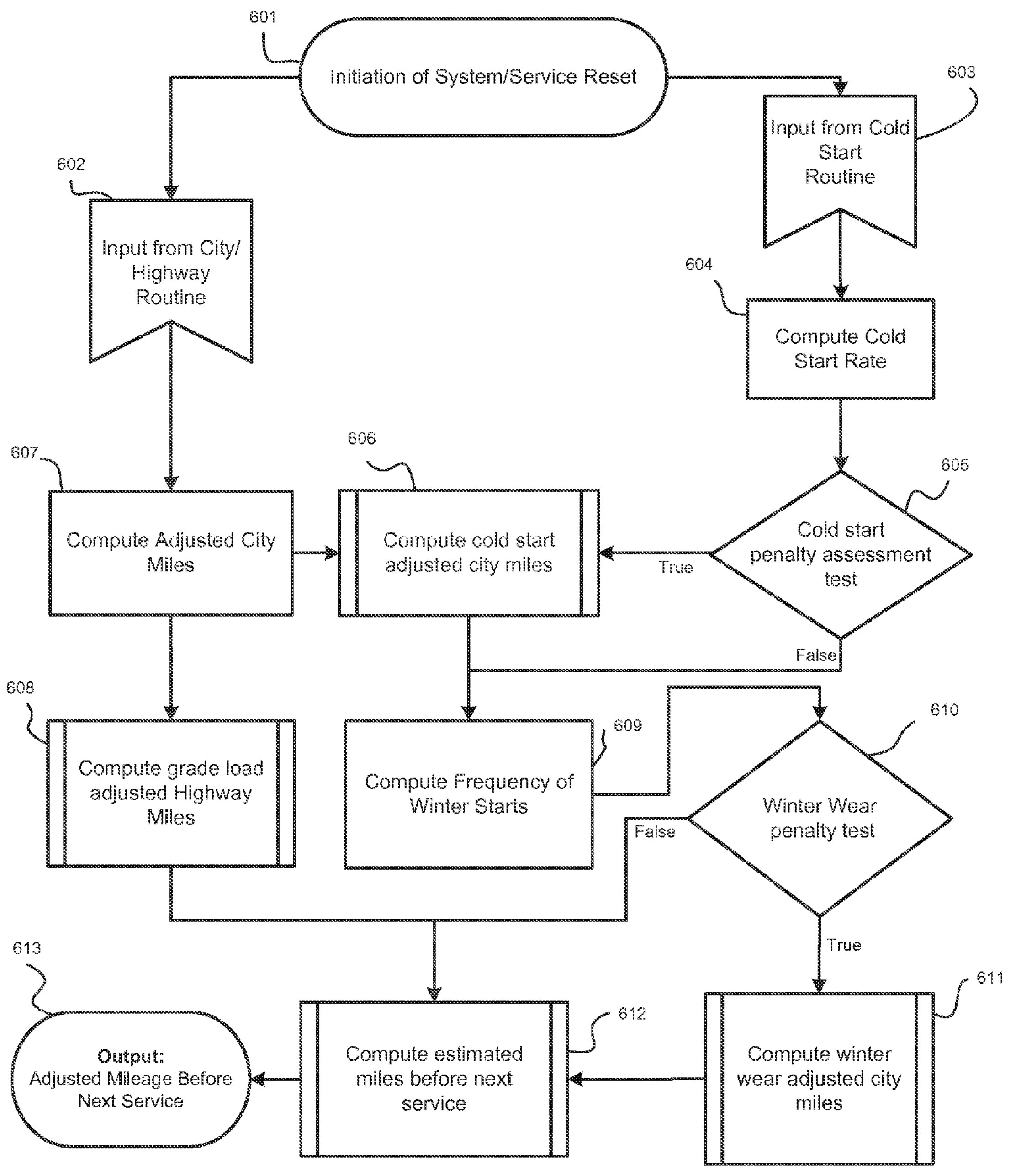
FIG. 6 details a specific methodology for adjusting the maintenance schedule according to adjustment factors and vehicle (device) operation determined by the logic from FIGS. 4 and 5.

Accumulated log values for total "cold" starts and total "winter" starts for the engine 508 are forwarded 509 to the mileage adjustment routine detailed in FIG. 6.

FIG. 6 details the methodology of this embodiment of the invention for modifying or adjusting the predicted next regular vehicle service by incorporating the wear factors computed in the routines detailed in FIGS. 4 and 5.

Each time the mileage adjustment routine is initiated or run 601, only the actual accumulated city, highway, and high grade highway miles ($D_{city}$, $D_{highway}$, $D_{loaded}$) are factored as inputs 602. Similarly, the logs of "cold" and "winter" starts (Cold_start_log, Winter_start_log) 603 are not modified by this portion of the invention system but used only as part of the predictive computation.

First, a global correction factor for general wear of city miles driven vs. highway miles driven is computed. As an example for this embodiment, a city mile is estimated to have the same wear as 2 highway miles, thus the City driving parameter is 2 as computed in 607. [$D_{city\_adjusted}=D_{city}$*City_F (city multiplier)]

"Cold" starts are clearly a standard aspect of any vehicle operation and thus only an abnormally high frequency of "cold" starts is factored into the prediction adjustment.

"Cold" start frequency per 100 miles is computed 604:

Cold_start_freq=Cold_start_log/($D_{city}$/100) and compared against a threshold parameter considered by an abnormally high frequency of cold starts 605:

Cold_start_freq>Cold_start_max. If such a condition exists, which is measured across all "city" mileage accumulated, a wear penalty is assessed, increasing the effective or adjusted city miles 606:

$$D_{city\_adjusted}=D_{city\_adjusted}*\text{Cold\_start\_factor}.$$

"Winter" cold starts, which represent extreme wear condition, are included as a penalty unless very infrequent. The frequency is computed 609:

Winter_start_freq=Winter_start_log/($D_{winter}$/1000) and then tested 610:

Winter_start_freq>Winter_start_freq_max. Operating a vehicle under frequent "winter" start conditions adds considerable effective wear mileage 611:

$$D_{city\_adjusted}=D_{city\_adjusted}*\text{Winter\_start\_factor}.$$

Highway steep grade load driving is penalized as a high wear operating condition 608:

$$D_{highway\_adjusted}=D_{highway}+D_{loaded}*\text{grade\_factor}$$

and the effective highway miles driven are increased by the set parameter.

Finally, the computed adjusted or effective city miles and adjusted or effective highway miles are deducted from the ideal or specified interval for periodic service set by the manufacturer 612:

$$D_{service}=D_{ideal}-D_{city\_adjusted}-D_{highway\_adjusted}$$

This value is available at any time by query from the device operator and can be set to trigger predictive notifications sent to the operator's or owner's mobile phone by text message, or to the owner by email 613.

Figure 7:
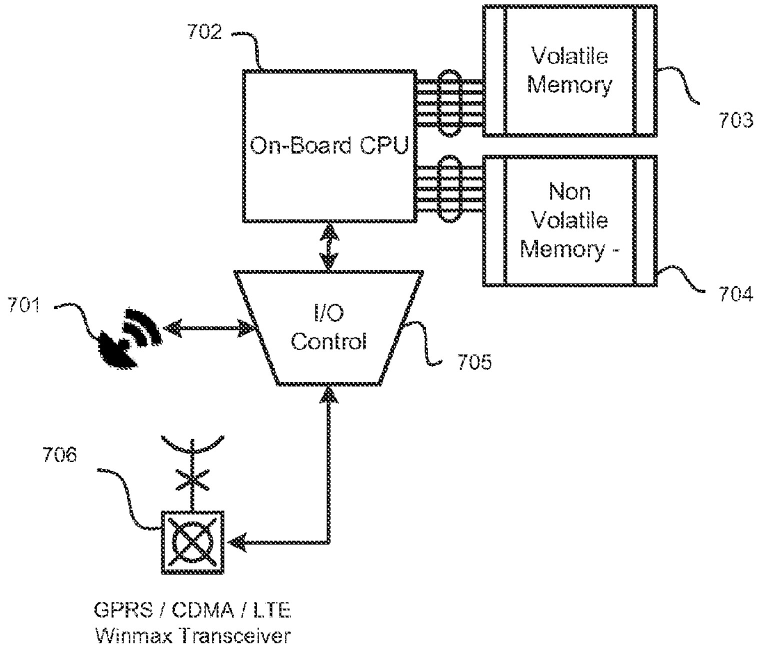

FIG. 7 provides a basic system component diagram illustrating the interaction of the most relevant aspects for the alternative embodiment device, including the location awareness unit 701, the device CPU 702, volatile on board memory 703 for processing system data and instructions during operation, and non-volatile memory 704 for storing operation code as well as the accumulation logs for the system such as mileage, cold starts, etc. Communication with the device owner or operator and system management data hub are accomplished in this embodiment via a GPRS transceiver 706.

It will be understood that the particular embodiments described in detail herein are illustrative of the invention and that many other embodiments are applicable. The principal features highlighted herein may be employed in many embodiments within the scope of the claims.

We claim:

1. A device for in-vehicle use that provides service schedule information for the vehicle, comprising:

a location aware sensor device for tracking the vehicle location, elevation, and time;

a data transceiver system for communicating over the internet;

an input/output control system for managing incoming and outgoing data related to the vehicle location, and the vehicle service schedule;

a system of non-volatile memory for storing instructions for processing the vehicle location data and service schedule;

a system of volatile memory for storing temporary data during the processing of instructions related to the vehicle location and service schedule;

a central processing unit for processing instructions and data related to the vehicle location, and the vehicle service schedule;

instructions stored in memory for the detection of proximity to an identified vehicle by a wireless data communication between the vehicle and said device which initiates tracking the vehicle location without concurrent user input to initiate said tracking;

instructions stored in memory for computation of vehicle accumulated mileage from said tracking of the vehicle location;

instructions stored in memory for determining vehicle speed for periods of time based upon the vehicle location;

instructions stored in memory for adjusting a predetermined vehicle service schedule based upon the determined vehicle speeds for said periods of time;

instructions stored in memory for communicating said adjusted vehicle service schedule to an identified user;

wherein said device uses no data received from said vehicle, other than for detection of the proximity of said device to said vehicle.

2. A device according to claim 1 wherein said device is a smartphone.

3. A device according to claim 1 also comprising:

instructions stored in memory for determining whether a vehicle is initiating a "cold" start based upon a vehicle location and a predetermined minimum stationary period for the vehicle at said location;

instructions stored in memory for determining the frequency of said "cold" starts;

instructions stored in memory for adjusting said predetermined vehicle service schedule based upon said determined frequency of "cold" starts.

4. A device according to claim 1 also comprising:

instructions stored in memory for retrieving the vehicle local ambient temperature;

instructions stored in memory for determining whether said local ambient temperature qualifies as a "winter" operating condition based upon a given threshold temperature;

instructions stored in memory for determining the frequency of said "cold" starts which also occur during said "winter" operating conditions;

instructions stored in memory for adjusting said predetermined vehicle service schedule based upon said determined frequency of said "cold" starts which also occur during said "winter" operating conditions.

5. A device according to claim 4, wherein said local ambient temperature is retrieved from an internet source based upon the vehicle location.

6. A device according to claim 4 also comprising:

a sensor for measuring ambient temperature wherein said vehicle local ambient temperature is retrieved from said sensor.

7. A device according to claim 1 also comprising:

instructions stored in memory for determining the vehicle travel grade based upon vehicle location and elevation;

instructions stored in memory for determining the fraction of high load vehicle operation, based upon the vehicle travel grade and vehicle speed;

instructions stored in memory for adjusting said predetermined vehicle service schedule based upon said fraction of high load vehicle operation.

8. A device according to claim 1 wherein said data communication uses the BLUETOOTH® protocol.

9. A method for providing service schedule information for a vehicle comprising;

tracking the vehicle location, elevation, and time from a location aware sensor device;

communicating over the internet by a data transceiver system;

managing incoming and outgoing data related to the vehicle location, and the vehicle service schedule by an input/output control system;

storing instructions for processing and vehicle location data and service schedule;

storing temporary data during the processing of instructions related to the vehicle location and service schedule;

processing instructions and data related to the vehicle location, and the vehicle service schedule;

initiating said tracking of the vehicle location upon detection of proximity to the identified vehicle by a wireless data communication between the vehicle and said device, which initiates said tracking without concurrent user input to initiate tracking of said vehicle;

computing the vehicle accumulated mileage from the vehicle location;

determining vehicle speed for periods of time from the vehicle location;

adjusting a predetermined vehicle service schedule based upon the determined vehicle speeds for said periods of time;

communicating said adjusted vehicle service schedule to an identified user;

wherein said method uses no data received from said vehicle other than for detection of the proximity of said device to said vehicle.

10. A method according to claim 9 wherein said method is performed utilizing a smartphone.

11. A method according to claim 9 also comprising:

allocating periods of vehicle motion as either highway driving or city driving based upon vehicle speed;

adjusting said predetermined vehicle service schedule based upon the allocated fractions of vehicle mileage for city and highway driving.

12. A method according to claim 9 also comprising:

determining whether a vehicle is initiating a "cold" start based upon a vehicle location and a predetermined minimum stationary period for the vehicle at said location;

determining the frequency of said "cold" starts;

adjusting said predetermined vehicle service schedule based upon said determined frequency of "cold" starts.

13. A method according to claim 12 also comprising:

retrieving the vehicle local ambient temperature;

determining whether said local ambient temperature qualifies as a "winter" operating condition based upon a given threshold temperature;

determining the frequency of said "cold" starts which also occur during said "winter" operating conditions;

adjusting said predetermined vehicle service schedule based upon said determined frequency of said "cold" starts which also occur during said "winter" operating conditions.

14. A method according to claim 13 wherein said local ambient temperature is retrieved from an internet source based upon the vehicle location.

15. A method according to claim 13 also comprising:

measuring ambient temperature wherein said vehicle local ambient temperature is retrieved from a sensor.

16. A method according to claim 9 also comprising:
determining the vehicle travel grade based upon the vehicle location and elevation;
determining the fraction of high load vehicle operation, based upon the vehicle travel grade and vehicle speed;
adjusting said predetermined vehicle service schedule based upon said fraction of high load vehicle operation.

17. A method according to claim 9 wherein said wireless data communication uses the BLUETOOTH® protocol.

* * * * *